(12) United States Patent
Tanaka

(10) Patent No.: US 12,337,780 B2
(45) Date of Patent: Jun. 24, 2025

(54) WORKING VEHICLE

(71) Applicant: KUBOTA CORPORATION, Osaka (JP)

(72) Inventor: Ryosuke Tanaka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/648,860

(22) Filed: Apr. 29, 2024

(65) Prior Publication Data

US 2024/0294134 A1 Sep. 5, 2024

Related U.S. Application Data

(63) Continuation of application No. PCT/JP2022/011688, filed on Mar. 15, 2022.

(30) Foreign Application Priority Data

Nov. 2, 2021 (JP) ................................ 2021-179693

(51) Int. Cl.
  *B60R 21/13* (2006.01)

(52) U.S. Cl.
  CPC ................................ *B60R 21/131* (2013.01)

(58) Field of Classification Search
  CPC ........ B60R 21/13; B60R 21/131; B62D 25/10
  See application file for complete search history.

(56) References Cited

U.S. PATENT DOCUMENTS

| 2005/0156422 | A1* | 7/2005 | Della Valle | B60R 21/131 280/756 |
| 2013/0049338 | A1* | 2/2013 | Alexander, IV | B60R 21/131 280/756 |
| 2024/0116435 | A1* | 4/2024 | Fujimoto | B60Q 1/04 |
| 2024/0300584 | A1* | 9/2024 | Anattasakul | H02S 10/40 |

FOREIGN PATENT DOCUMENTS

| CN | 110786148 A | * | 2/2020 | ............ A01D 75/20 |
| GB | 1182282 A | * | 2/1970 | |
| JP | 2007-247342 A | | 9/2007 | |
| JP | 2009-173240 A | | 8/2009 | |
| JP | 2011-184008 A | | 9/2011 | |

OTHER PUBLICATIONS

Liu et al., Energy-absorbing rollover protection structure of riding mower, Feb. 14, 2020, EPO, CN 110789148 A, Machine Translation of Description (Year: 2020).*
Official Communication issued in International Patent Application No. PCT/JP2022/011688, mailed on May 31, 2022.

* cited by examiner

*Primary Examiner* — James A English
(74) *Attorney, Agent, or Firm* — Keating & Bennett, LLP

(57) ABSTRACT

A work vehicle includes a vehicle body, an engine mounted on the vehicle body, a hood covering the engine, a driver's seat on one side with respect to the hood in a front-rear direction of the vehicle body, a step extending under the driver's seat and having a width wider than a lateral width of the hood in a left-right direction of the vehicle body, and a ROPS including left and right columns respectively located on two lateral sides of the vehicle body between a front end of the hood and a front end of the driver's seat, the left and right columns including upper end portions coupled to each other. Each of the columns is located within a range extending from a laterally outermost end of the hood and to a laterally outermost end of the step in the left-right direction of the vehicle body.

9 Claims, 5 Drawing Sheets

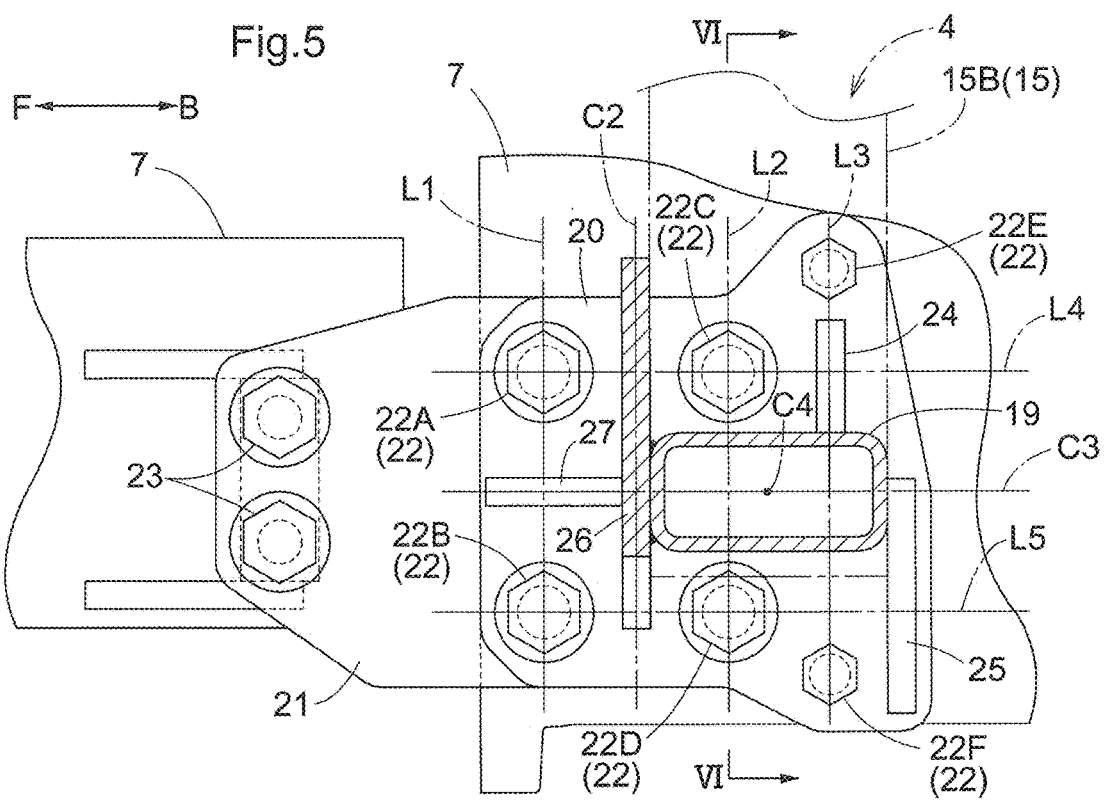

WORKING VEHICLE

CROSS REFERENCE TO RELATED APPLICATIONS

This application claims the benefit of priority to Japanese Patent Application No. 2021-179693 filed on Nov. 2, 2021 and is a Continuation Application of PCT Application No. PCT/JP2022/011688 filed on Mar. 15, 2022. The entire contents of each application are hereby incorporated herein by reference.

BACKGROUND OF THE INVENTION

1. Field of the Invention

The present invention relates to work vehicles.

2. Description of the Related Art

A work vehicle described in Japanese Patent Application Laid-Open Publication No. 2007-247342 is an example of conventionally known work vehicles. The work vehicle described in Japanese Patent Application Laid-Open Publication No. 2007-247342 includes a vehicle body ("travel body 2" in the document), an engine ("engine 30" in the document) mounted on the vehicle body, a hood ("hood 36" in the document) covering the engine, a driver's seat ("driver's seat 43" in the document) on the rear side with respect to the hood, and a ROPS ("center POPS 4" in the document) including left and right columns respectively located on two lateral sides of the vehicle body between a front end of the hood and a front end of the driver's seat, and upper end portions of the left and right columns are coupled to each other.

SUMMARY OF THE INVENTION

The work vehicle described in Japanese Patent Application Laid-Open Publication No. 2007-247342 has room for improvement in terms of making the ROPS compact in the left-right direction of the vehicle body.

Under the above circumstances, there is demand for a work vehicle in which a ROPS can be made compact in the left-right direction of the vehicle body.

An example embodiment of the present invention provides a work device including a vehicle body, an engine mounted on the vehicle body, a hood covering the engine, a driver's seat on a rear side with respect to the hood, a step extending under the driver's seat and having a width wider than a lateral width of the hood in a left-right direction of the vehicle body, and a roll-over protective structure (ROPS) including left and right columns respectively located on two lateral sides of the vehicle body between a front end of the hood and a front end of the driver's seat, the left and right columns including upper end portions coupled to each other, wherein each of the columns is located within an area between a laterally outermost end of the hood and a laterally outermost end of the step as viewed in a front-rear direction of the vehicle body.

According to this characteristic configuration, the columns do not protrude laterally outward from the laterally outermost ends of the step. Therefore, the ROPS can be made compact in the left-right direction of the vehicle body.

Furthermore, it is preferable that an example embodiment of the present invention further includes left and right lower supports respectively supporting lower end portions of the left and right columns, and the lower supports extend from the lower end portions of the columns toward a vehicle body center in the left-right direction of the vehicle body.

According to this characteristic configuration, the lower end portions of the columns are coupled to the vehicle body by the lower supports, and therefore, the strength of the ROPS can be increased.

Furthermore, it is preferable that, in an example embodiment of the present invention, laterally outer end portions of the lower supports are coupled to the lower end portions of the columns from laterally inner sides.

According to this characteristic configuration, the laterally outer end portions of the lower supports are covered by the lower end portions of the columns from laterally outer sides. Therefore, the laterally outer end portions of the lower supports can be kept from being exposed to the laterally outer sides.

Furthermore, it is preferable that, in an example embodiment of the present invention, the columns include hollow structures, and the lower end portions of the columns are open downward.

According to this characteristic configuration, even if rainwater enters the inside of the columns, the rainwater within the columns can be discharged downward from the lower end portions of the columns.

Furthermore, it is preferable that an example embodiment of the present invention further includes left and right brackets respectively coupled to laterally inner end portions of the left and right lower supports, each of the left and right brackets is fixed to the vehicle body with a plurality of fasteners at a plurality of positions in a front-rear direction of the vehicle body, and each of the lower supports has a center deviated to one side with respect to a fixing center in the front-rear direction of the vehicle body, the fixing center being a center between a front fastener and a rear fastener out of the fasteners.

According to this characteristic configuration, each lower support is attached to the bracket in such a manner that the center of the lower support is shifted to one side with respect to the fixing center in the front-rear direction of the vehicle body. This configuration can increase the degree of freedom in determining an attachment position of the lower support on the bracket in the front-rear direction of the vehicle body.

Furthermore, it is preferable that an example embodiment of the present invention further includes a device for the engine on one side with respect to a lower support out of the lower supports in the front-rear direction of the vehicle body, and the center of the lower support is deviated to a side opposite to the device with respect to the fixing center in the front-rear direction of the vehicle body.

This configuration makes it possible to attach the lower support to the bracket in such a manner that the lower support does not interfere with the device for the engine.

Furthermore, it is preferable that an example embodiment of the present invention further includes a first fastener and a second fastener included in the fasteners, the first fastener being located above the lower support, the second fastener being located below the lower support, a first reinforcement coupled to the lower support and a bracket out of the brackets and extending from the lower support toward a side in an up-down direction on which side the first fastener is located, and a second reinforcement coupled to the lower fastener and the bracket and extending from the lower support toward a side in the up-down direction on which side the second fastener is located.

According to this characteristic configuration, coupling strength between the lower support and the bracket can be reinforced by the first reinforcement and the second reinforcement. Also, a load acting on the lower support can be released via the first reinforcement to the first fastener and via the second reinforcement to the second fastener.

Furthermore, it is preferable that an example embodiment of the present invention further includes a third reinforcement located on one side with respect to the lower support in the front-rear direction of the vehicle body and coupled to the lower support and the bracket, a third fastener included in the fasteners and located on a side opposite to the lower support with respect to the third reinforcement in the front-rear direction of the vehicle body, and a fourth reinforcement extending from the third reinforcement toward the third fastener in the front-rear direction of the vehicle body and coupled to the bracket and the third reinforcement.

According to this characteristic configuration, the coupling strength between the lower support and the bracket can be reinforced by the third reinforcement and the fourth reinforcement. Also, a load acting on the lower support can be released via the third reinforcement and the fourth reinforcement to the third fastener.

Furthermore, it is preferable that an example embodiment of the present invention further includes a fourth fastener included in the fasteners and located on the lower support side with respect to the third reinforcement in the front-rear direction of the vehicle body, and the third reinforcement is between the third fastener and the fourth fastener in the front-rear direction of the vehicle body.

According to this characteristic configuration, a load acting on the lower support can be released via the third reinforcement to the third fastener and the fourth fastener.

The above and other elements, features, steps, characteristics and advantages of the present invention will become more apparent from the following detailed description of the example embodiments with reference to the attached drawings.

BRIEF DESCRIPTION OF THE DRAWINGS

FIG. 5 is a left side view showing the support structure for the ROPS.
FIG. 6 is a cross-sectional view taken along the line VI-VI in FIG. 5.

DETAILED DESCRIPTION OF THE EXAMPLE EMBODIMENTS

The following describes example embodiments of the present invention based on the drawings. In the following description, the direction of an arrow F will be referred to as "the front side of a vehicle body", the direction of an arrow B will be referred to as "the rear side of the vehicle body", the direction of an arrow L will be referred to as "the left side of the vehicle body", and the direction of an arrow R will be referred to as "the right side of the vehicle body".

Figure 1:
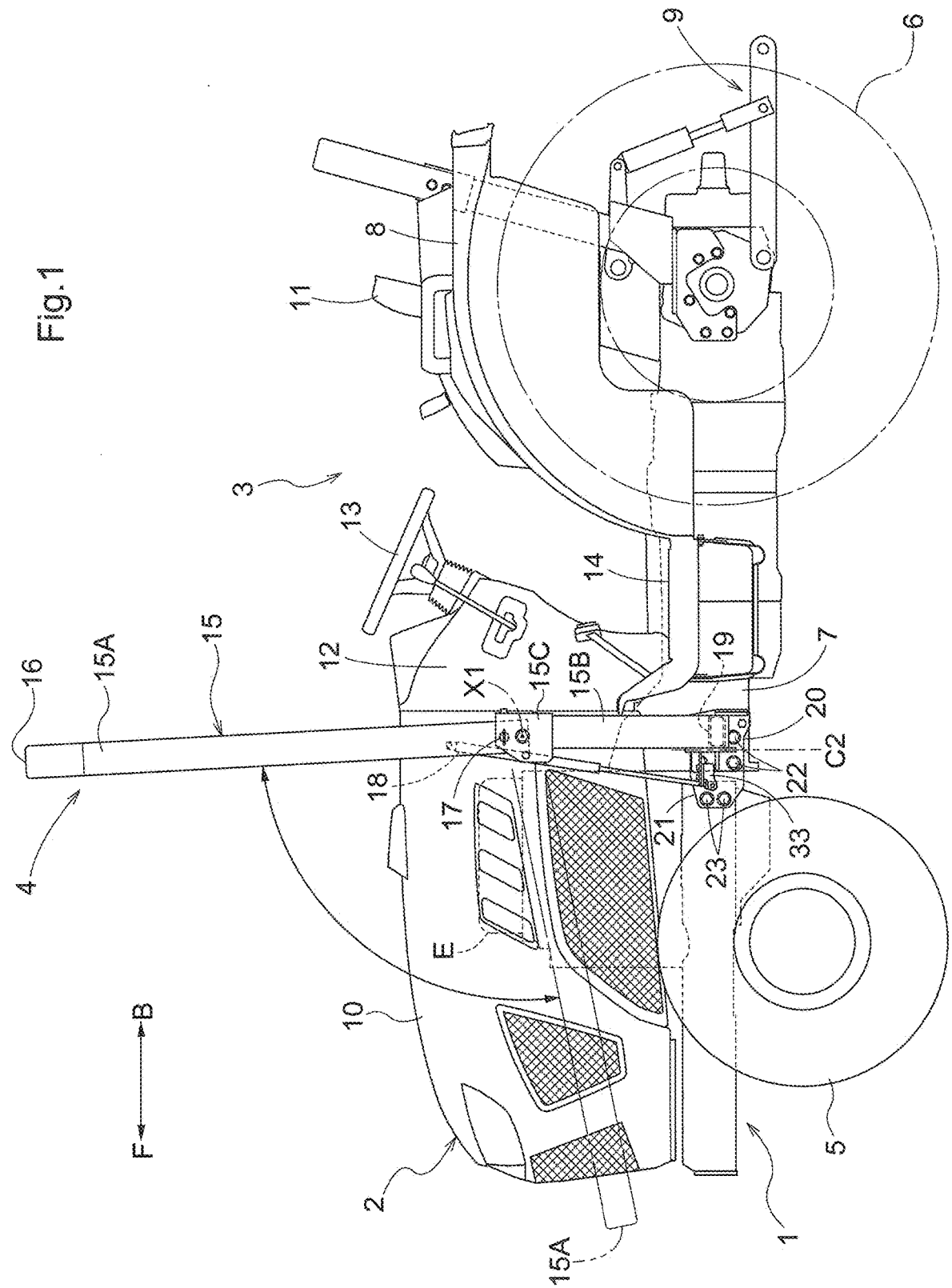
FIG. 1 is a left side view showing a tractor.
Figure 2:
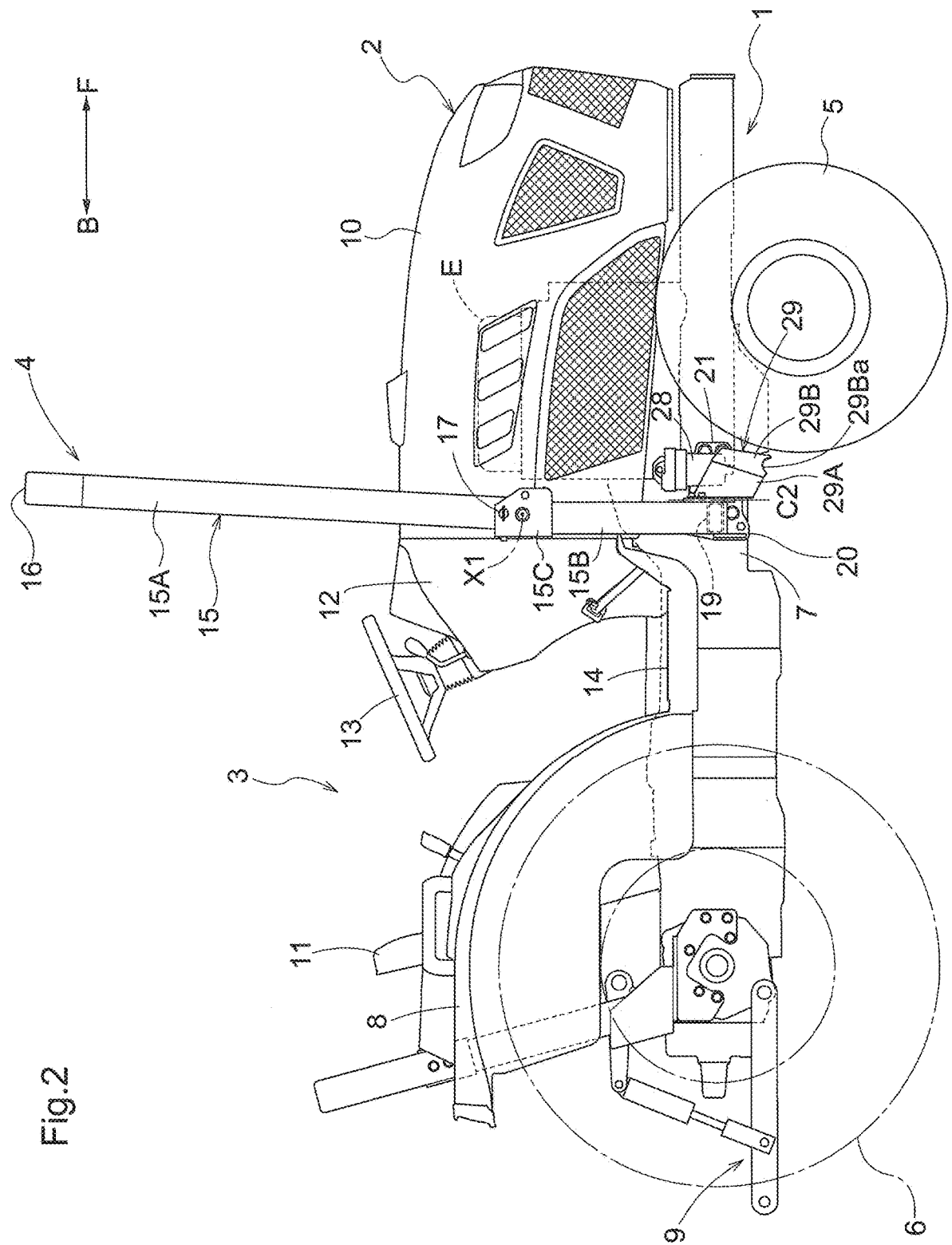
FIG. 2 is a right side view showing the tractor.
Figure 3:
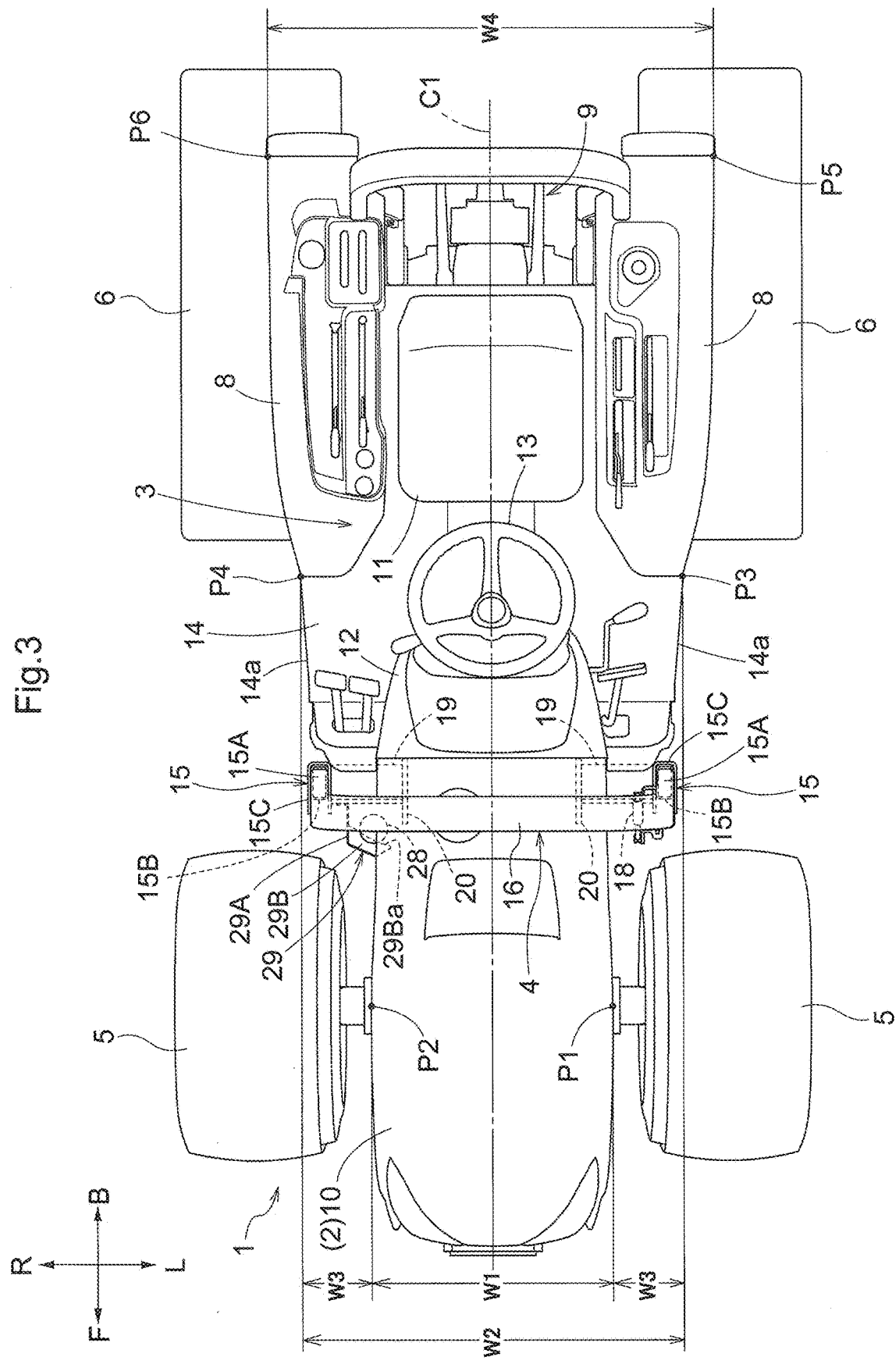
FIG. 3 is a plan view showing the tractor.

FIGS. 1 to 3 show a tractor (corresponding to "a work vehicle"). The tractor includes a vehicle body 1, a prime mover section 2, a driving section 3, and a ROPS (Roll-Over Protective Structure) 4.

The vehicle body 1 includes left and right front wheels 5, left and right rear wheels 6, and a body frame 7. The body frame 7 is supported by the front wheels 5 and the rear wheels 6. The front wheels 5 are steerable and drivable. The rear wheels 6 are not steerable but are drivable. The left rear wheel 6 is covered by a left fender 8. The right rear wheel 6 is covered by a right fender 8. The tractor is switchable between a two-wheel driven state in which only the rear wheels 6 are driven and a four-wheel driven state in which the front wheels 5 and the rear wheels 6 are driven. The tractor includes a link mechanism 9, to which a work device (not shown) is coupled, in a rear portion of the body frame 7.

The prime mover section 2 is in a front portion of the vehicle body 1. The prime mover section 2 includes an engine E and a hood 10. The engine E is mounted on the front portion of the vehicle body 1. The hood 10 houses the engine E. The hood 10 is openable and closable by swinging about a rear fulcrum.

The driving section 3 is on the rear side of the prime mover section 2. The driving section 3 includes a driver's seat 11, a front panel 12, a steering wheel 13, and a step 14. The driver's seat 11 is on the rear side with respect to the hood 10. The front panel 12 is continuous from a rear end portion of the hood 10 in front of the driver's seat 11. The steering wheel 13 is provided on the front panel 12. The steering wheel 13 is for steering the vehicle body 1 (the front wheels 5).

The step 14 is under the driver's seat 11. That is to say, the step 14 extends below the driver's seat 11 on the front side thereof. The step 14 defines a floor portion of the driving section 3. In FIG. 3, W1 indicates a lateral width of the hood 10, and W2 indicates a lateral width of the step 14. The step 14 is wider than the lateral width W1 of the hood 10 in the left-right direction of the vehicle body 1. The step 14 includes left and right edge portions 14a, and the distance between the left and right edge portions 14a in the left-right direction of the vehicle body 1 increases rearward.

As shown in FIGS. 1 to 3, the ROPS 4 spans a rear portion of the hood 10 in the left-right direction of the vehicle body 1. The ROPS 4 includes left and right columns 15 and a beam 16. The left column 15 is on the left side of the vehicle body 1 between a front end of the hood 10 and a front end of the driver's seat 11. In the present example embodiment, the left column 15 is on the left side of the rear portion of the hood 10. The right column 15 is on the right side of the vehicle body 1 between the front end of the hood 10 and the front end of the driver's seat 11. In the present example embodiment, the right column 15 is on the right side of the rear portion of the hood 10. Upper end portions of the left and right columns 15 are coupled by the beam 16. Each of the columns 15 includes an upper column portion 15A, a lower column portion 15B, and a support portion 15C.

The upper column portion 15A and the lower column portion 15B include by hollow structures (pipes) having rectangular or substantially rectangular cross sections. A lower end portion of the lower column portion 15B is open downward. The support portion 15C is provided at an upper end portion of the lower column portion 15B. The upper column portion 15A is supported by the support portion 15C in such a manner as to be swingable about a swing axis X1 extending in the left-right direction of the vehicle body 1. The beam 16 extends from the upper end portion of the left column 15 to the upper end portion of the right column 15. The beam 16 is defined by a hollow structure (pipe) having a rectangular or substantially rectangular cross section.

The left and right upper column portions 15A and the beam 16 are defined by a single unitary structure to define a ROPS body. The position of the ROPS body can be changed between a use position at which the ROPS body extends upward from the swing axis X1 and a housed position at which the ROPS body extends forward from the swing axis X1. The ROPS body can be fixed to the use position and the housed position with left and right pins 17. The tractor includes a damper 18 that biases the ROPS body so as to swing upward about the swing axis X1.

In FIG. 3, P1 indicates the leftmost end of the hood 10 (corresponding to "a laterally outermost end of the hood"), P2 indicates the rightmost end of the hood 10 (corresponding to "a laterally outermost end of the hood"), P3 indicates the leftmost end of the step 14 (the left edge portion 14a) (corresponding to "a laterally outermost end of the step"), P4 indicates the rightmost end of the step 14 (the right edge portion 14a) (corresponding to "a laterally outermost end of the step"), P5 indicates the leftmost end of the left fender 8, P6 indicates the rightmost end of the right fender 8, W3 indicates a range from the leftmost end P1 of the hood 10 to the leftmost end P3 of the step 14 in the left-right direction of the vehicle body 1, W3 indicates a range from the rightmost end P2 of the hood 10 to the rightmost end P4 of the step 14 in the left-right direction of the vehicle body 1, and W4 indicates a range from the leftmost end P5 of the left fender 8 to the rightmost end P6 of the right fender 8 in the left-right direction of the vehicle body 1. The lateral width W1 of the hood 10 is the range from the leftmost end P1 of the hood 10 to the rightmost end P2 of the hood 10 in the left-right direction of the vehicle body 1. The lateral width W2 of the step 14 is the range from the leftmost end P3 of the step 14 to the rightmost end P4 of the step 14 in the left-right direction of the vehicle body 1.

As shown in FIG. 3, the ROPS 4 is within the range W4 and within the lateral width W2 of the step 14. The left column 15 is within the left range W3. That is to say, the left column 15 is located on the left side of the rear portion of the hood 10 between the left front wheel 5 and the step 14 in the front-rear direction of the vehicle body 1. The right column 15 is within the right range W3. That is to say, the right column 15 is located on the right side of the rear portion of the hood 10 between the right front wheel 5 and the step 14 in the front-rear direction of the vehicle body 1.

Figure 4:
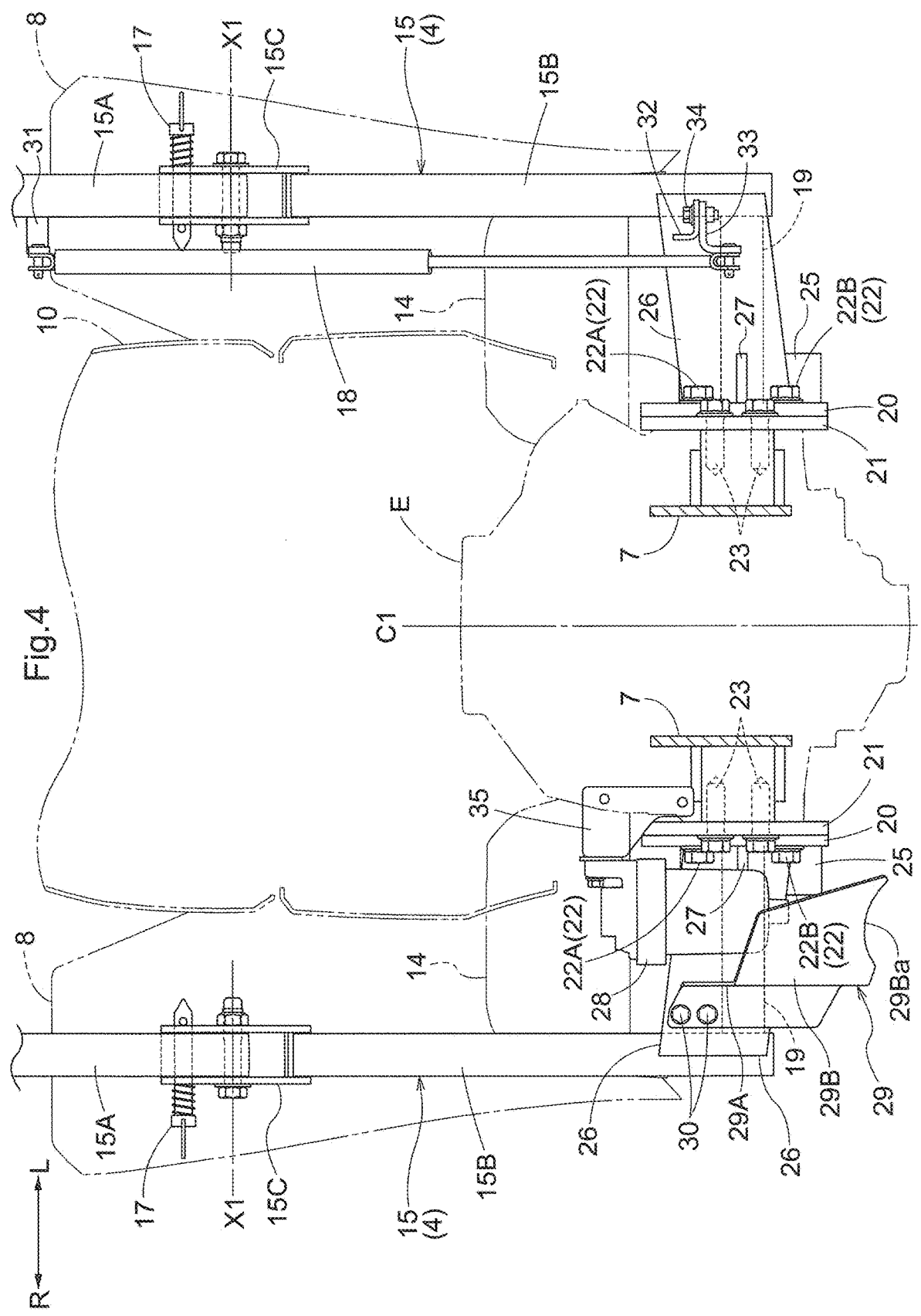
FIG. 4 is a front view showing a lower portion of a ROPS and a support structure for the ROPS.

As shown in FIGS. 4 to 6, the tractor includes a left lower support 19 that supports a lower end portion of the left column 15. The tractor also includes a right lower support 19 that supports a lower end portion of the right column 15. The lower supports 19 are defined by hollow structures (pipes) having rectangular or substantially rectangular cross sections.

The left lower support 19 extends from the lower end portion of the left lower column portion 15B toward a vehicle body center C1 in the left-right direction of the vehicle body 1. A left end portion of the left lower support 19 is coupled (in this example embodiment, welded) to the lower end portion of the left lower column portion 15B from the right side. A lower end of the left lower column portion 15B is below a lower surface of the left lower support 19.

The right lower support 19 extends from the lower end portion of the right lower column portion 15B toward the vehicle body center C1 in the left-right direction of the vehicle body 1. A right end portion of the right lower support 19 is coupled (in this example embodiment, welded) to the lower end portion of the right lower column portion 15B from the left side. A lower end of the right lower column portion 15B is below a lower surface of the right lower support 19.

As shown in FIGS. 4 to 6, the tractor includes a left outer bracket 20 (corresponding to "a bracket") coupled (in this example embodiment, welded) to a right end portion of the left lower support 19. The tractor also includes a right outer bracket 20 coupled (in this example embodiment, welded) to a left end portion of the right lower support 19. The tractor includes a left inner bracket 21 between the left outer bracket 20 and a left side portion of the body frame 7. The tractor also includes a right inner bracket 21 between the right outer bracket 20 and a right side portion of the body frame 7.

The left outer bracket 20 and the right outer bracket 20 have similar configurations, and therefore, the following mainly describes the left outer bracket 20 out of the left and right outer brackets 20.

The outer bracket 20 is fixed to the body frame 7 with a plurality of (in this example embodiment, six) bolts 22 (corresponding to "fasteners") together with the inner bracket 21. The inner bracket 21 is fixed to the body frame 7 with the six bolts 22 together with the outer bracket 20 and also fixed to the body frame 7 with a plurality of (in this example embodiment, two) bolts 23 separately from the outer bracket 20.

In the present example embodiment, the bolts 22 include a bolt 22A (corresponding to "a third fastener"), a bolt 22B (corresponding to "a third fastener"), a bolt 22C (corresponding to "a fourth fastener"), a bolt 22D (corresponding to "a fourth fastener"), a bolt 22E (corresponding to "a first fastener"), and a bolt 22F (corresponding to "a second fastener"). The bolts 22E and 22F have diameters smaller than diameters of the bolts 22A, 22B, 22C, and 22D.

The bolts 22A and 22B are at the same position in the front-rear direction of the vehicle body 1. The bolts 22C and 22D are at the same position in the front-rear direction of the vehicle body 1. The bolts 22E and 22F are at the same position in the front-rear direction of the vehicle body 1. In FIG. 5, L1 indicates a straight line passing through the center of the bolt 22A and the center of the bolt 22B, L2 indicates a straight line passing through the center of the bolt 22C and the center of the bolt 22D, L3 indicates a straight line passing through the center of the bolt 22E and the center of the bolt 22F, and C2 indicates a first fixing center (corresponding to "a fixing center") that is a center between the straight lines L1 and L2 in the front-rear direction of the vehicle body 1. The first fixing center C2 is a center between the front bolts 22A and 22B and the rear bolts 22C and 22D in the front-rear direction of the vehicle body 1.

The bolts 22A, 22C, and 22E are above the lower support 19. The bolts 22B, 22D, and 22F are below the lower support 19. The bolts 22A and 22C are at the same position in the up-down direction. The bolts 22B and 22D are at the same position in the up-down direction. In FIG. 5, L4 indicates a straight line passing through the center of the bolt 22A and the center of the bolt 22C, L5 indicates a straight line passing through the center of the bolt 22B and the center of the bolt 22D, and C3 indicates a second fixing center that is a center between the straight lines L4 and L5 in the up-down direction. The second fixing center C3 is a center between the upper bolts 22A and 22C and the lower bolts 22B and 22D in the up-down direction.

The lower support 19 is on the rear side with respect to the first fixing center C2. That is to say, the lower support 19 has a center shifted to the rear side with respect to the first fixing center C2. In FIG. 5, C4 indicates a cross-sectional center of the lower support 19. The cross-sectional center C4 is the center of the lower support 19 in the front-rear direction of the vehicle body 1 and in the up-down direction. The cross-sectional center C4 is located at the second fixing center C3 on the rear side with respect to the first fixing center C2.

The tractor includes a first reinforcement 24 coupled to the lower support 19 and the outer bracket 20 and extending from the lower support 19 toward the bolt 22E (in this example embodiment, upward) in the up-down direction. The first reinforcement 24 is defined by a plate-shaped structure. The first reinforcement 24 is coupled (in this example embodiment, welded) to an upper surface of the lower support 19 and a laterally outer surface of the outer bracket 20. The first reinforcement 24 extends along the straight line L3.

The tractor includes a second reinforcement 25 coupled to the lower support 19 and the outer bracket 20 and extending from the lower support 19 toward the bolt 22F (in this example embodiment, downward) in the up-down direction. The second reinforcement 25 is defined by a plate-shaped structure. The second reinforcement 25 is coupled (in this example embodiment, welded) to a rear surface of the lower support 19 and the laterally outer surface of the outer bracket 20.

The tractor includes a third reinforcement 26 coupled to the lower support 19 and the outer bracket 20 and located on one side (in this example embodiment, the front side) with respect to the lower support 19 in the front-rear direction of the vehicle body 1. The third reinforcement 26 is defined by a plate-shaped structure. In the present example embodiment, the third reinforcement 26 is also coupled to the lower column portion 15B. That is to say, the second reinforcement 25 is coupled to the lower support 19, the outer bracket 20, and the lower column portion 15B. The third reinforcement 26 is coupled (in this example embodiment, welded) to a front surface of the lower support 19, the laterally outer surface of the outer bracket 20, and a front surface of the lower end portion of the lower column portion 15B. The third reinforcement 26 is located at the first fixing center C2. The third reinforcement 26 slopes downward toward the vehicle body center C1 in the left-right direction of the vehicle body 1.

The bolts 22A and 22B are located on the side (in this example embodiment, the front side) opposite to the lower support 19 with respect to the third reinforcement 26 in the front-rear direction of the vehicle body 1. The bolts 22C and 22D are located on the lower support 19 side (in this example embodiment, the rear side) with respect to the third reinforcement 26 in the front-rear direction of the vehicle body 1. The third reinforcement 26 is between the bolts 22A and 22B and the bolts 22C and 22D in the front-rear direction of the vehicle body 1. Specifically, the third reinforcement 26 is located at the first fixing center C2.

The tractor includes a fourth reinforcement 27 coupled to the outer bracket 20 and the third reinforcement 26 and extending from the third reinforcement 26 toward the bolts 22A and 22B (in this example embodiment, forward) in the front-rear direction of the vehicle body 1. The fourth reinforcement 27 is defined by a plate-shaped structure. The fourth reinforcement 27 is coupled (in this example embodiment, welded) to a front surface of the third reinforcement 26 and the laterally outer surface of the outer bracket 20. The fourth reinforcement 27 is between the bolt 22A and the bolt 22B in the up-down direction. Specifically, the fourth reinforcement 27 is located at the second fixing center C3.

As shown in FIG. 4, the damper 18 extends from the left upper column portion 15A to the left third reinforcement 26. An upper end portion of the damper 18 is supported by the left upper column portion 15A via a first stay 31. A lower end portion of the damper 18 is supported by the left third reinforcement 26 via a second stay 32 and a third stay 33. The second stay 32 and the third stay 33 are fixed with two front and rear bolts 34.

As shown in FIGS. 2 to 4, the tractor includes a fuel filter 28 for the engine E (corresponding to "a device for the engine") on one side (in this example embodiment, the front side) with respect to the left lower support 19 in the front-rear direction of the vehicle body 1. The fuel filter 28 is an oil-water separating fuel filter. Separated water is discharged downward from a bottom portion of the fuel filter 28. The fuel filter 28 is supported by the engine E via a stay 35. The center of the left lower support 19 is shifted to the side (in this example embodiment, the rear side) opposite to the fuel filter 28 with respect to the first fixing center C2 in the front-rear direction of the vehicle body 1.

The fuel filter 28 is covered by a cover 29. The cover 29 is supported by the right third reinforcement 26. The cover 29 is fixed to the right third reinforcement 26 with bolts 30. The cover 29 includes a lateral surface portion 29A covering the fuel filter 28 from the right side and a front surface portion 29B covering the fuel filter 28 from the front side.

The front surface portion 29B extends rearward while extending rightward and inclines forward. This configuration keeps the front surface portion 29B from interfering with the right front wheel 5 when the right front wheel 5 is steered. A substantially arc-shaped notch 29Ba is located in a lower edge portion of the front surface portion 29B. This configuration keeps the lower edge portion of the front surface portion 29B from being hit by water separated and discharged from the bottom portion of the fuel filter 28.

Other Example Embodiments (1) In the above example embodiments, the left and right columns 15 are respectively located on two lateral sides of the rear portion of the hood 10. However, there is no limitation to this configuration of the above example embodiments as long as the left and right columns 15 are respectively located on the two lateral sides of the vehicle body 1 between the front end of the hood 10 and the front end of the driver's seat 11. For example, the left and right columns 15 may also be respectively located on two lateral sides of the step 14.

(2) In the above example embodiments, the laterally outer end portion of each lower support 19 is coupled to the lower end portion of the lower column portion 15B from the laterally inner side. However, the laterally outer end portion of each lower support 19 may also be coupled to the lower end portion of the lower column portion 15B from below in such a manner that the lower end portion of the lower column portion 15B is placed on the laterally outer end portion of the lower support 19.

(3) In the above example embodiments, the center of each lower support 19 is shifted to the rear side with respect to the first fixing center C2. However, the center of each lower support 19 may also be shifted to the front side with respect to the first fixing center C2. Alternatively, a configuration is also possible in which the center of each lower support 19 is not shifted to either the front side or the rear side with respect to the first fixing center C2. That is to say, the cross-sectional center C4 may also be located at the first fixing center C2.

(4) In the above example embodiments, the center of the left lower support 19 is shifted to the side (the rear side) opposite to the fuel filter 28 with respect to the first fixing center C2 in the front-rear direction of the vehicle body 1. However, the center of the left lower support 19 may also be shifted to the fuel filter 28 side (the front side) with respect to the first fixing center C2 in the front-rear direction of the vehicle body 1.

(5) In the above example embodiments, the third reinforcement 26 is located on the front side with respect to the lower support 19. However, the third reinforcement 26 may also be located on the rear side with respect to the lower support 19. Alternatively, a configuration is also possible in which third reinforcements 26 are respectively located on the front side and the rear side with respect to the lower support 19.

(6) In the above example embodiments, the left and right columns 15 and the beam 16 are defined by hollow structures having rectangular or substantially rectangular cross sections. However, cross-sectional shapes of the left and right columns 15 and the beam 16 are not limited to rectangular or substantially rectangular shapes. For example, cross-sectional shapes of the left and right columns 15 and the beam 16 may also be circular or substantially circular shapes.

Example embodiments of the present invention are applicable to multipurpose vehicles (utility vehicles) as well as tractors.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A work vehicle comprising:
a vehicle body including a body frame;
an engine mounted on the vehicle body;
a hood covering the engine;
a driver's seat on a rear side with respect to the hood;
a step extending under the driver's seat and having a width wider than a lateral width of the hood in a left-right direction of the vehicle body; and
a roll-over protective structure including left and right columns respectively located on two lateral sides of the vehicle body between a front end of the hood and a front end of the driver's seat, the left and right columns including upper end portions coupled to each other; and
left and right lower supports respectively supporting lower end portions of the left and right columns; wherein
each of the columns is located within an area between a laterally outermost end of the hood and a laterally outermost end of the step as viewed in a front-rear direction of the vehicle body; and
each of the left and right lower supports is supported by the body frame.

2. The work vehicle according to claim 1, wherein
the left and right lower supports extend from the lower end portions of the columns toward a vehicle body center in the left-right direction of the vehicle body.

3. The work vehicle according to claim 2, wherein laterally outer end portions of the left and right lower supports are coupled to the lower end portions of the columns from laterally inner sides.

4. The work vehicle according to claim 3, wherein
the columns include hollow structures; and
the lower end portions of the columns are open downward.

5. The work vehicle according to claim 2, further comprising:
left and right brackets respectively coupled to laterally inner end portions of the left and right lower supports; wherein
each of the left and right brackets is fixed to the vehicle body with a plurality of fasteners at a plurality of positions in the front-rear direction of the vehicle body; and
each of the left and right lower supports has a center deviated to one side with respect to a fixing center in the front-rear direction of the vehicle body, the fixing center being a center between a front fastener and a rear fastener of the plurality of fasteners.

6. The work vehicle according to claim 5, further comprising:
a first fastener and a second fastener included in the plurality of fasteners, the first fastener being located above the left and right lower supports, the second fastener being located below the left and right lower supports;
a first reinforcement coupled to one of the left and right lower supports and one of the left and right brackets and extending from the one of the left and right lower supports toward a side in an up-down direction on which side the first fastener is located; and
a second reinforcement coupled to the one of the left and right lower supports and the one of the left and right brackets and extending from the one of the left and right lower supports toward a side in the up-down direction on which side the second fastener is located.

7. The work vehicle according to claim 6, further comprising:
a third reinforcement located on one side with respect to the one of the left and right lower supports in the front-rear direction of the vehicle body and coupled to the one of the left and right lower supports and the one of the left and right brackets;
a third fastener included in the plurality of fasteners and located on a side opposite to the one of the left and right lower supports with respect to the third reinforcement in the front-rear direction of the vehicle body; and
a fourth reinforcement extending from the third reinforcement toward the third fastener in the front-rear direction of the vehicle body and coupled to the one of the left and right brackets and the third reinforcement.

8. The work vehicle according to claim 7, further comprising:
a fourth fastener of the plurality of fasteners located on a side of the one of the left and right lower supports with respect to the third reinforcement in the front-rear direction of the vehicle body; wherein
the third reinforcement is between the third fastener and the fourth fastener in the front-rear direction of the vehicle body.

9. A work vehicle comprising:
a vehicle body;
an engine mounted on the vehicle body;
a hood covering the engine;
a driver's seat on a rear side with respect to the hood;
a step extending under the driver's seat and having a width wider than a lateral width of the hood in a left-right direction of the vehicle body:
a roll-over protective structure including left and right columns respectively located on two lateral sides of the vehicle body between a front end of the hood and a front end of the driver's seat, the left and right columns including upper end portions coupled to each other;

left and right lower supports respectively supporting lower end portions of the left and right columns;

left and right brackets respectively coupled to laterally inner end portions of the left and right lower supports; and a device for the engine on one side with respect to the left and right lower supports in the front-rear direction of the vehicle body; wherein each of the columns is located within an area between a laterally outermost end of the hood and a laterally outermost end of the step as viewed in the front-rear direction of the vehicle body;

the left and right lower supports extend from the lower end portions of the columns toward a vehicle body center in the left-right direction of the vehicle body:

each of the left and right brackets is fixed to the vehicle body with a plurality of fasteners at a plurality of positions in the front-rear direction of the vehicle body;

each of the left and right lower supports has a center deviated to one side with respect to a fixing center in the front-rear direction of the vehicle body, the fixing center being a center between a front fastener and a rear fastener of the plurality of fasteners; and the center of the left and right lower supports is deviated to a side opposite to the device with respect to the fixing center in the front-rear direction of the vehicle body.

\* \* \* \* \*